(12) United States Patent
Williams et al.

(10) Patent No.: US 6,364,619 B1
(45) Date of Patent: Apr. 2, 2002

(54) SEALED COMPRESSOR WITH TEMPERATURE FEEDBACK TO MOTOR PROTECTOR UNIT

(75) Inventors: John R. Williams, Bristol, VA (US); Zili Sun; Carlos Zamudio, both of Arkadelphia, AR (US); Jason Hugenroth, Hope, AR (US); Greg Hahn; Thomas Barito, both of Arkadelphia, AR (US); William Bush, Sraneateles, NY (US); Joe T. Hill, Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/576,571

(22) Filed: May 22, 2000

(51) Int. Cl.[7] ............................ F04B 49/10; F04B 49/00
(52) U.S. Cl. ........................ 417/32; 417/44.1; 323/907
(58) Field of Search .................... 417/44.1, 32; 323/907

(56) References Cited

U.S. PATENT DOCUMENTS

| | | | | |
|---|---|---|---|---|
| 5,118,260 A | * | 6/1992 | Fraser, Jr. .................... | 417/18 |
| 5,345,126 A | * | 9/1994 | Bunch .......................... | 310/68 |
| 5,368,446 A | * | 11/1994 | Rode ............................ | 417/18 |
| 5,452,989 A | * | 9/1995 | Rood et al. ................... | 417/29 |
| 5,690,475 A | * | 11/1997 | Yamada et al. ............... | 417/32 |

FOREIGN PATENT DOCUMENTS

| | | | | |
|---|---|---|---|---|
| GB | 2-075774 A | * | 11/1981 | ............. H02P/1/42 |
| GB | 2-122430 A | * | 1/1984 | .......... H01R/13/66 |
| JP | 8-219565 | * | 8/1996 | ............. F25B/1/00 |

* cited by examiner

Primary Examiner—Timothy S. Thorpe
Assistant Examiner—Timothy P. Solak
(74) Attorney, Agent, or Firm—Carlson, Gaskey & Olds

(57) ABSTRACT

An improved motor protection switch incorporates a parallel feedback component mounted in parallel to a heater in a motor protection circuit. The parallel feedback component senses the temperature of a compressor component. If tie temperature increases then the current flow through the heater increases. This causes a motor protector switch to open. In this way, the feedback component provides feedback from the compressor pump unit to the motor protection circuit more quickly than in the prior art.

14 Claims, 3 Drawing Sheets

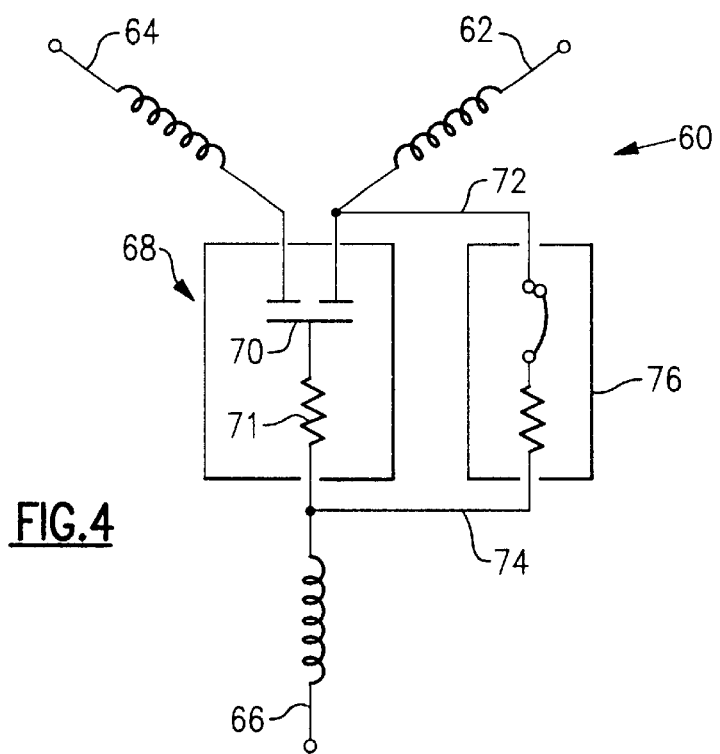
FIG.4
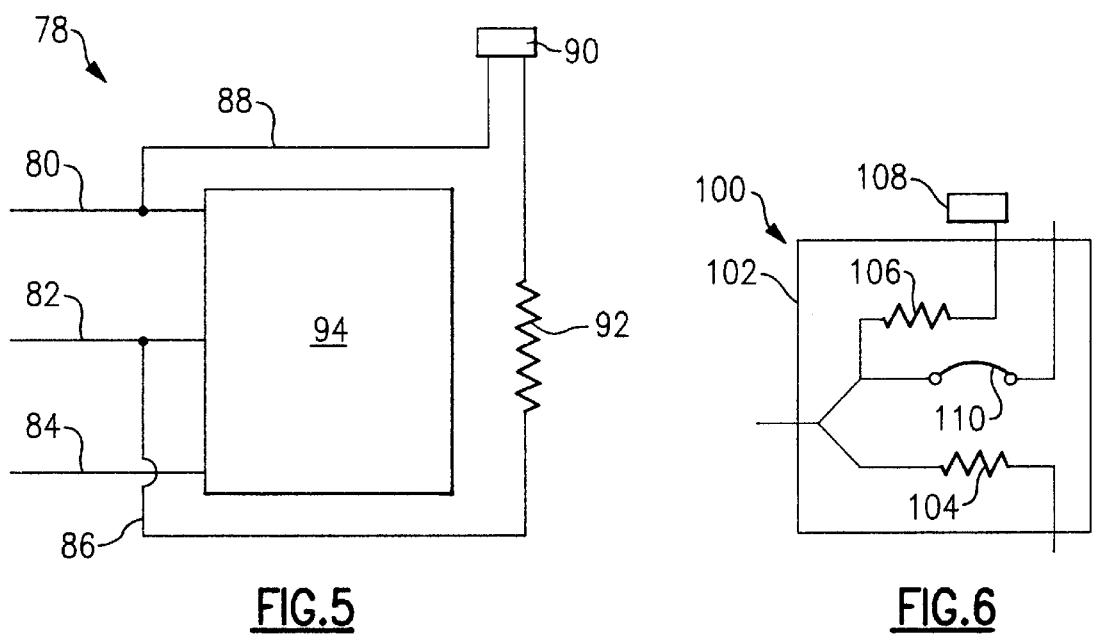
FIG.5
FIG.6

SEALED COMPRESSOR WITH TEMPERATURE FEEDBACK TO MOTOR PROTECTOR UNIT

BACKGROUND OF THE INVENTION

This application relates to a motor protector circuit for a sealed compressor wherein temperature feedback is provided to the motor protector circuit from the pump unit.

Compressors are utilized in many modern cooling applications. The compressor compresses a refrigerant which is then delivered into a refrigerant cycle for cooling purposes. Compressors are typically mounted in a hermetically sealed housing incorporating an electric motor and a compressor pump unit. The motors are typically provided with a protector circuit which is opened to stop operation of the motor when a particularly high temperature is sensed. In this way, the motor is protected from being operated during unduly high temperature conditions. The presence of an unduly high temperature at the motor is indicative of problems in the system, and thus this provides protection not only to the motor, but also to other areas of the compressor and the refrigeration system.

One known type of protector circuit is used with a motor driven by a single phase power supply. In this type of motor, the windings for the motor stator typically include run and start windings. The two windings are driven by a current, and an electrical phase offset between the two windings causes a rotor associated with a shaft to rotate. This in turn drives the compressor pump unit. The protector circuit associated with this type of motor includes a single common line which passes through a selectively open temperature sensitive switch, and then branches into a line communicating with a start winding heater, which also provides a return for the start windings. The common line also branches into a return for the run windings. When the switch opens, the motor is stopped.

The start winding heater is positioned close to the temperature sensitive switch, such that if the start winding heater increases in temperature, it opens the switch on the run windings.

The above-described protector circuit stops the motor should the run windings experience an unduly high temperature, or should the start windings experience an unduly high temperature or current. Sometimes a small heater is also provided in the run winding branch which provides additional protection in the event of unduly high run winding temperature.

However, there are problems which may exist within the compressor pump unit which are not quickly sensed at the motor. These conditions may allow the motor to operate for an undesirable amount of time until the motor protector circuit acts to shut down the motor. Thus, there is a need for providing fisher sensitivity or feedback to the motor protector circuit.

SUMMARY OF THE INVENTION

In a disclosed embodiment of this invention, a system is provided which increases the temperature of the start winding heater when a feedback component elsewhere in the compressor is at an elevated temperature. in this way, the motor protector switch circuit is opened, stopping operation or the motor. In a preferred embodiment of his invention, the feedback component is a switch or positive temperature co-efficient resistor mounted in parallel with the start winding heater. The switch or positive temperature co-efficient resistor is placed in contact with a component in the compressor which is to be sensed.

In one preferred embodiment the feedback component contacts a portion of a scroll compressor. If the portion of the scroll compressor experiences an undesirably high temperature, then the positive temperature co-efficient resistor increases its resistance. Alternatively, the switch is opened if the temperature exceeds a predetermined maximum. Under either condition, the feedback line in parallel with the start winding heater now forces more current through the start winding heater. When the positive temperature co-efficient resistor increases its resistance, more current flows through the start winding heater. If the feedback switch is opened, additional current flows through the start winding heater. In either case, the start winding heater increases its temperature, and causes the main switch on the common line to open.

In alternative embodiments, there may be an auxiliary heater which provides the feedback.

These and other features of the present invention can be best understood from the following specification and drawings, the following of which is a brief description.

BRIEF DESCRIPTION OF THE DRAWINGS

FIG. 4 shows another embodiment.

FIG. 5 shows yet another embodiment.

FIG. 6 shows a final embodiment.

DETAILED DESCRIPTION OF A PREFERRED EMBODIMENT

Figure 1:
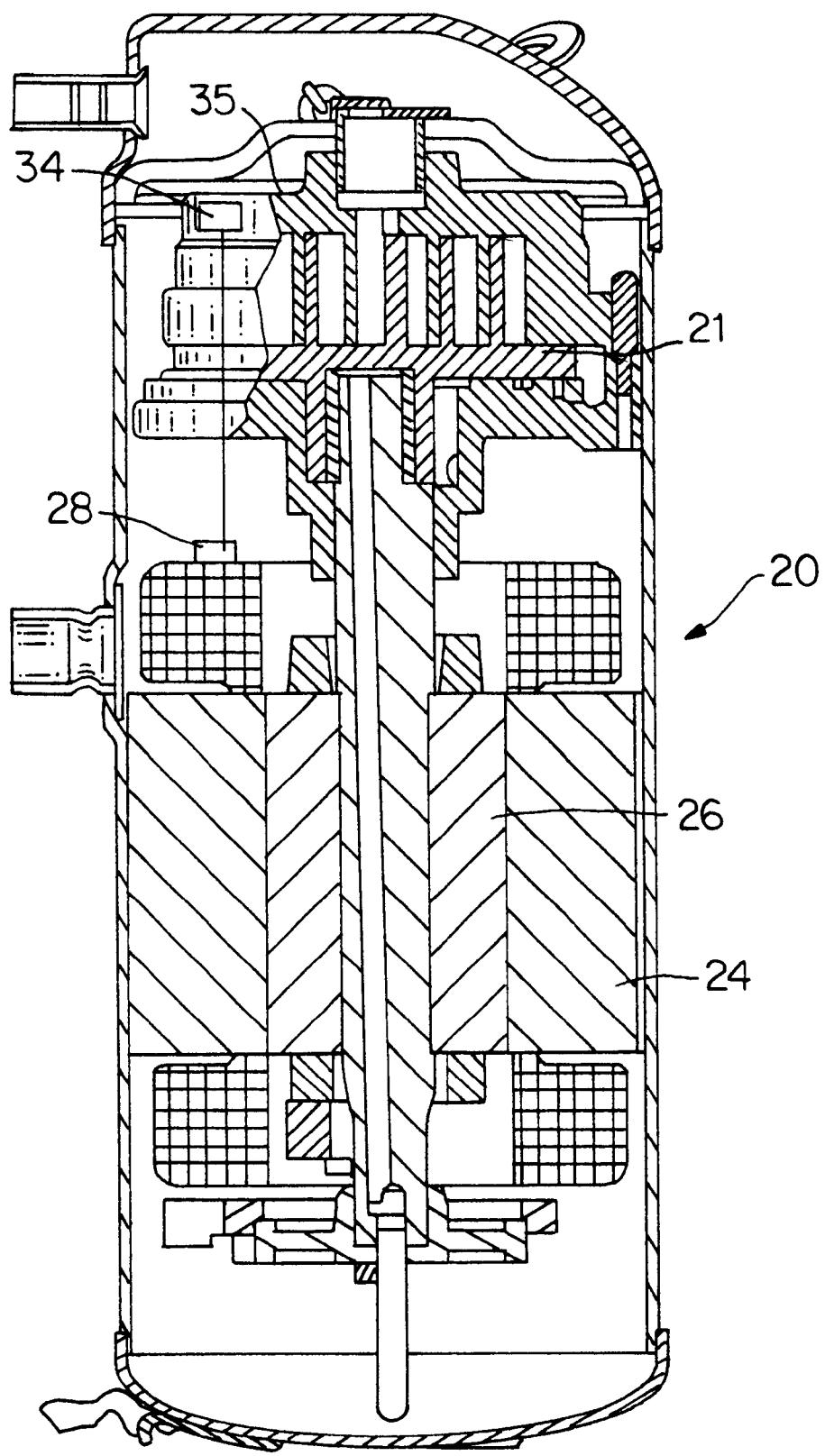
FIG. 1 is a schematic view of a scroll compressor incorporating this invention.

FIG. 1 shows a scroll compressor 20 incorporating an orbiting scroll 21, a non-orbiting scroll 35, a motor stator 24, a motor rotor 26, and a motor protector switch 28. As known, a power supply delivers current through the motor protector switch 28 to drive the motor 26 and 24.

In the present invention, a pump cartridge protector circuit, or feedback component 34 is mounted in combination with the protector switch 28. As shown, the circuit 34 is preferably in contact with the non-orbiting scroll 35.

Figure 2:
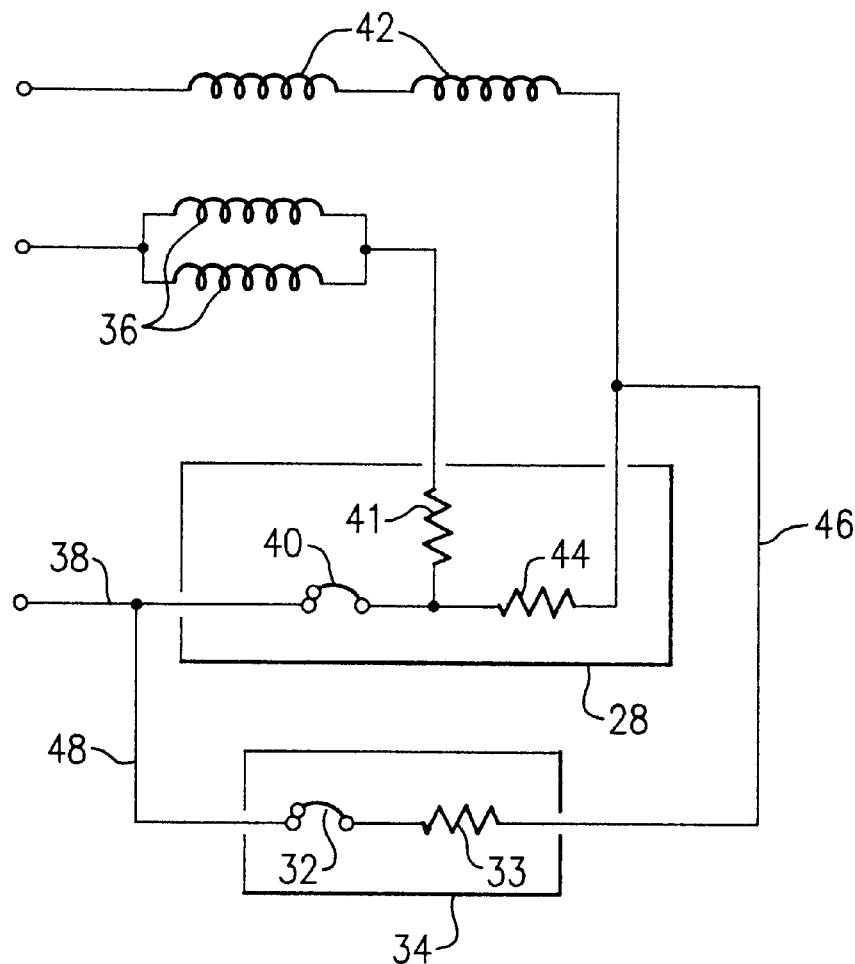
FIG. 2 is a circuit schematic of the present invention.

As shown on FIG. 2, run windings 36 and start windings 42 each receive current to drive the rotor 26. The ends of n windings 36 and start windings 42 which are opposite the current supply are joined together to communicate with common neutral line 38. Common neutral line 38 also contains a bi-metal switch 40 which is selectively opened to break current flow through common neutral line 38, and thus to run windings 36 and start windings 42, when a predetermined temperature is reached. Run windings 36 also communicate through a low resistance run winding heater 41 which is positioned adjacent bi-metal switch 40. Start windings 42 also communicate through a high resistance start winding heater 44 which is also positioned adjacent bi-metal switch 40. Preferably, bi-metal switch 40, run winding heater 41, and start winding heater 44 are enclosed in a scaled unit as motor protector switch 28. The terms "low" and "high" resistance as used here are relative terms, as the absolute resistance of both heaters is necessarily low to prevent unnecessary electrical losses or generation of excess heat.

Figure 3:
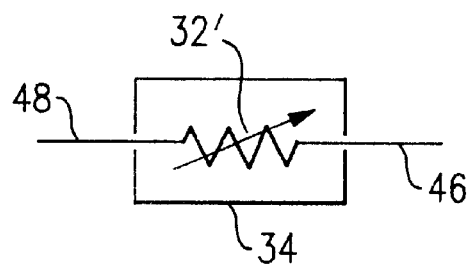
FIG. 3 shows another embodiment.

A jumper line 46 and a return line 48 are connected into the circuit as shown in the figure. These lines communicate feedback component 34 in parallel with the start winding heater 44 and bi-metal switch 40. As shown in this figure, the feedback component 34 is a bi-mental switch 32 (similar to bi-metal switch 40) and a medium resistance secondary heater 33. Bi-metal switch 32 will open as the temperature of the secondary heater 33 or of component 34 increases beyond a selected value. Component 34 is preferably in contact with non-orbiting scroll 35 so that it will specifically respond to the temperature of non-orbiting scroll 35. Alternatively, FIG. 3 shows that a positive temperature coefficient resistor 32', or so-called PTC resistor, which increases in resistance as its temperature increases in response to high current or to the temperature of feedback component 34, may be substituted for bi-metal switch 32 and secondary heater 33.

During normal operation of the motor, bi-metal switches 40 and 32 are closed and current can flow both through the run windings 36 and the start windings 42. Additionally, since secondary heater 33, or alternatively PTC resistor 32', is of lower resistance than start winding heater 44, most of the start winding current flows through feedback component 34 and a relatively low current flows through start winding heater 44. If an undesirable high current flows through the main windings, as in an overload condition, run winding heater 41 increases its temperature and causes bi-metal switch 40 to open, interrupting current to the main windings 36 and stopping the motor. Current to start windings 42 may not be interrupted, but the current through start windings 42 is small when the motor is stopped and thus the heating rate is low in this condition and presents no particular hazard.

If an undesirable high current flows through start windings 42, as may occur in some running conditions, secondary heater 33 increases its temperature and causes by-metal switch 32 to open. Alternately, the high current will cause PTC resistor 32' to increase its resistance and impede the flow of current, not unlike bi-metal switch 32. This causes all the start winding current to be directed instead through start winding heater 44 which increases its temperature and causes bi-metal switch 40 to open, interrupting current to both the main windings 36 and start windings 42 and stopping the motor.

If the temperature of feedback component 34 is elevated to a sufficiently high level, bi-metal switch 32 will open or alternately PTC resistor 32' will increase its resistance even if the start winding current remains low. This causes all the start winding current to be directed instead through start winding heater 44 which increases its temperature and causes bi-metal switch 40 to open, interrupting current to both the main windings 36 and start windings 42 and stopping the motor.

An embodiment 60, FIG. 4, shows a motor protector circuit 68 for a three-phase power supply. The above disclosed embodiments all relate to a single phase power supply. in the embodiment 60, three phases of power 62, 64 and 66 are supplied to the protector circuit 68. As is known, a bi-metal switch 70 normally completes contact between the supply 62, 64 and 66, however, the switch 70 is heated by a heater 71 to open if the temperature exceeds a predetermined threshold.

In this embodiment, taps 72 and 74 communicate with a temperature sensor arrangement 76, which may be as described above. This system will operate generally as similar to fie above embodiments.

FIG. 5 shows yet another embodiment 78, having a common line 82 leading to run windings 80, and start windings 84. These lines connect within a protector switch 94, which may be as known. Taps 86 and 88 supply power to a switch 90, which include a sensor such as is described above. However, switch 90 includes appropriate circuitry such that if the predetermined temperature is reached, the current is increased through a separate heater 92 positioned adjacent to the protector switch 94. The separate heater will heat the components within the protector switch 94 and cause the motor to be stopped if the heat from switch 90 exceeds the predetermined threshold. In a sense, this embodiment could be said to have a "heater" for purposes of the claim in this application that actually consists of two heaters, one inside the protector circuit 94, and the auxiliary heater 92.

FIG. 6 shows yet another embodiment 100, wherein a motor protector switch 102 includes a main heater 104 and an auxiliary heater 106. The auxiliary heater 106 communicates with a switch 108 as in the FIG. 5 embodiment. The auxiliary heater 106 is positioned adjacent to switch 110, as is the main heater 104. Essentially, this embodiment is quite similar to the FIG. 5 embodiment, however, the auxiliary heater 106 is positioned within the motor protector circuit at least for packaging purposes.

In essence, the present invention incorporates a protection switch into a known motor protector switch in parallel to a main or auxiliary heater, wherein feedback from a compressor component is provided to increase the temperature of the heater if the compressor component which is being monitored increases in temperature. Thus, the present invention provides feedback from the pump unit to the motor protector switch more quickly than would be the case in the prior art.

A preferred embodiment of this invention has been disclosed; however, a worker in this art would recognize that many modifications would come within the scope of this invention. For that reason, the following claims should be studied to determine the true scope and content of this invention.

What is claimed is:

1. A sealed compressor comprising:
   a compressor pump unit mounted within a compressor housing;
   a motor for driving said compressor pump unit, said motor including a stator and a rotor, said stator being provided with a motor protection circuit, said motor protection circuit incorporating a shut-off switch which is selectively opened when a predetermined temperature is reached, and said motor protection circuit further including a heater, said heater acting to cause said shut-off switch to open if current through said heater is increased to a sufficiently high amount; and
   a feedback circuit mounted in association with said heater, and providing feedback from another component within said compressor to increase the current flow through said heater if the temperature of said other component increases.

2. A compressor as recited in claim 1, wherein said compressor pump unit is a scroll compressor unit.

3. A compressor as recited in claim 1, wherein said feedback circuit includes a sensor mounted on a part of said compressor pump unit.

4. A compressor as recited in claim 3, wherein said sensor is a positive temperature co-efficient resistor which increases its resistance as the temperature of said part increases.

5. A compressor as recited in claim 3, wherein said sensor is a switch which opens when a predetermined temperature is reached at said part.

6. A compressor as recited in claim 1, wherein said stator includes both run and start windings, and said heater being a start winding heater.

7. A compressor as recited in claim 1, wherein said heater includes a main heater and an auxiliary heater, said feedback circuit providing feedback to said auxiliary heater.

8. A compressor as recited in claim 7, wherein said auxiliary heater is positioned to be adjacent to said shut-off switch.

9. A compressor as recited in claim 1, wherein said motor is driven by single phase power.

10. A compressor as recited in claim 1, wherein said motor is driven by three-phase power.

11. A sealed compressor comprising:

a scroll compressor pump unit mounted within a compressor housing;

a motor for driving said compressor pump unit, said motor including a stator and a rotor, said stator being provided with a motor protection circuit, said motor protection circuit incotporating a shut-off switch which is selectively opened when a predetermined temperature is reached, said stator including both run and start windings, and said motor protection circuit further including a start winding heater, said start winding heater acting to cause said shut-off switch to open if current through said start winding heater is increased to a sufficiently high amount; and a feedback circuit mounted in parallel to said start winding heater, and providing feedback from a component within said compressor to increase the current flow through said start winding heater if the temperature of said component increases, said feedback circuit including a sensor mounted to sense heat from said component in said scroll compressor pump unit.

12. A compressor as recited in claim 11, wherein said component is a non-orbiting scroll member.

13. A compressor as recited in claim 11, wherein said sensor is a positive temperature co-efficient resistor which increases its resistance as the temperature of said part.

14. A compressor as recited in claim 11, wherein said sensor is a switch which opens when a predetermined temperature is reached at said part.

\* \* \* \* \*